(12) United States Patent
Munshi

(10) Patent No.: US 10,956,218 B2
(45) Date of Patent: *Mar. 23, 2021

(54) ENQUEUING KERNELS FROM KERNELS ON GPU/CPU

(71) Applicant: Apple Inc., Cupertino, CA (US)

(72) Inventor: Aaftab A. Munshi, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,128

(22) Filed: Nov. 25, 2019

(65) Prior Publication Data

US 2020/0167200 A1   May 28, 2020

Related U.S. Application Data

(63) Continuation of application No. 14/138,967, filed on Dec. 23, 2013, now Pat. No. 10,489,205.

(60) Provisional application No. 61/856,513, filed on Jul. 19, 2013.

(51) Int. Cl.
*G06T 1/00* (2006.01)
*G06F 9/50* (2006.01)

(52) U.S. Cl.
CPC .......... *G06F 9/5027* (2013.01); *G06F 9/5044* (2013.01)

(58) Field of Classification Search
CPC ......... G06T 15/005; G06T 1/20; G06T 15/04; G09G 5/363; G06F 9/3851
USPC ...................................................... 345/522
See application file for complete search history.

(56) References Cited

U.S. PATENT DOCUMENTS

2014/0149710 A1\* 5/2014 Rogers et al. .......... G06F 12/02
711/170

OTHER PUBLICATIONS

Woolley, C., Introduction to OpenCL, by Cliff Woolley, NVIDIA, Developer Technology Group, 2010. [Online], [Retrieved on Jul. 2, 2020]. Retrieved from the internet: <URL: https://www3.ntu.edu.sg/home/ehchua/programming/opengl/cg_introduction.html> (Year: 2010).*

Claessen, K., etc. Expressive Array Constructs in an Embedded GPU Kernel Programming Language, DAMP'12, Jan. 28, 2012, Philadelphia, PA, USA. [Online], [Retrieved on Jul. 2, 2020]. Retrieved from the internet: <URL: https://svenssonjoel.github.io/writing/expressive.pdf> (Year: 2012).*

(Continued)

*Primary Examiner* — Gordon G Liu
(74) *Attorney, Agent, or Firm* — Blank Rome LLP

(57) ABSTRACT

Graphics processing units (GPUs) and other compute units are allowed to enqueue tasks for themselves by themselves, without needing a host processor to queue the work for the GPU. Built-in functions enable kernels to enqueue kernels for execution on a device. In some embodiments, ndrange kernels execute over an N-dimensional range to provide data-parallel operations. Task kernels provide task-parallel operations. In some embodiments, kernels may be defined using clang block syntax. The order of execution of commands on a compute unit may be constrained or allow execution of commands out-of-order. Compute units may control when kernels enqueued by the compute unit begins execution.

20 Claims, 12 Drawing Sheets

(56) References Cited

OTHER PUBLICATIONS

NVIDIA, Dynamic Parallelism in CUDA (by NVIDIA in Jul. 2010). [Online], [Retrieved on Jul. 2, 2020]. Retrieved from the internet: <URL: http://developer.download.nvidia.com/GTC/PDF/GTC2012/PresentationPDF/S0338-GTC2012-CUDA-Programming-Model.pdf > (Year: 2010).*
"Dynamic Parallelism in CUDA," (by NVIDIA in Jul. 2010).
"Expressive Array Constructs in an Embedded GPU Kernel Programming Language" (by Koen Claessen, Mary Sheeran, Bo Joel Svensson, DAMP'12, Jan. 28, 2012, Philadelphia, PA, USA).
"Heterogeneous Computing with OpenCL 2.0" (by David R. Raeli, Perhaad Mistry, Dana Schaa, and Dong Ping Zhang, a textbook).
"Introduction to OpenCL" (by Cliff Woolley, NVIDIA, Developer Technology Group, 2010).

* cited by examiner

```
typedef struct _ndrange_t { uint work_dim; // can be 1, 2 or 3 size_t global_work_offset[3];

size_t global_work_size[3];

size_t local_work_size[3];

} ndrange_t;
```

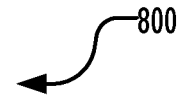

```
kernel ndrange void
my_func_A(global int *a, global int *b, global int *c)
{
        ...
}
kernel ndrange void
my_func_B(global int *a, int4 m)
{
        ...
}
kernel task void
my_func_C(queue_t q, image2d_t imgA, kernel_t kA
                        global int *a, global int *b, global int *c)
{
        int4 m;
        ndrange_t ndrange_A, ndrange_B;
        // build ndrange information
        ...
        // example — enqueue a kernel_t object
        enqueue_kernel(q, kA, &ndrange_A);
        ...
        // example — enqueue a kernel function using the
        // generated function that is used to build a kernel_t
        kernel_t k = create_kernel_my_func_B(a, m);
        enqueue_kernel(q, k, &ndrange_B);
}
```

FIG. 8

```
kernel ndrange void
dp_func_A(queue_t q, ...)
{
...
        // queue a single instance of task_A to device queue q
        // wait for kernel_A to finish execution before the
        // queued task begins execution
        if (get_global_id(0) == 0)
        {
                kernel_t k =
                        create_kernel_evaluate_dp_work_A (...);
        // enqueue the kernel
        enqueue_kernel(q, evaluate_dp_work_A,
                CLK_ENQUEUE_FLAGS_WAIT_KERNEL,
                NULL);
        }
}
```
910

```
kernel task void
evaluate_dp_work_A(queue_t q,...)
{
        // check if more work needs to be performed
        bool more_work = check_new_work(...);
        if (more_work)
        {
                size_t global_work_size = compute_global_size(...);
                kernel_t k = create_kernel_dp_func_A(...);
                // build nd-range descriptor
                size_t local_work_size;
                get_kernel_workgroup_size(get_device_id(),
                                        k, 1, &local_work_size);
                ndrange_t ndrange = ndrange_1D(global_work_size,
                                        local_work_size);
                // queue the nd-range kernel
                enqueue_kernel(q, dp_func_A,
                        CLK_ENQUEUE_FLAGS_WAIT_KERNEL,
                        &ndrange);
        }
}
```
920

FIG. 9

```
kernel task void
foo(queue_t q0, queue_t q1,
        kernel_t barA_kernel, kernel_t barB_kernel, ...)
{
        ...
        event_t evt0;
        // queues q0 and q1 are in-order queues
        // enqueue kernel to queue q0
        enqueue_kernel(q0, barA_kernel,
                CLK_ENQUEUE_FLAGS_NO_WAIT,
                0, NULL, &evt0);
        // enqueue kernel to queue q1
        enqueue_kernel(q1, barB_kernel,
                CLK_ENQUEUE_FLAGS_NO_WAIT,
                1, &evt0, NULL);
        // release event evt0. This will get released
        // after barA_kernel enqueued in queue q0 has finished
        // execution and barB_kernel enqueued in queue q1 and
        // waits for evt0 is submitted for execution i.e. wait
        // for evt0 is satisfied.
        release_event(evt0);
}
```

FIG. 10

```
kernel task void
foo(queue_t q, kernel_t barA_kernel,
        kernel_t barB_kernel, kernel_t barC_kernel, ...)
{
        ...
        event_t marker_event;
        // queue q is an out-of-order queue
        enqueue_kernel(q, barA_kernel,
                CLK_ENQUEUE_FLAGS_NO_WAIT);
        enqueue_kernel(q, barB_kernel,
                CLK_ENQUEUE_FLAGS_NO_WAIT);
        // barA_kernel and barB_kernel can be executed
        // out of order. we need to wait for both these
        // kernels to finish execution before barC_kernel
        // starts execution so we enqueue a marker command and
        // then enqueue barC_kernel that waits on the event
        // associated with the marker.
        enqueue_marker(q, 0, NULL, &marker_event);
        enqueue_kernel(q, barC_kernel,
                CLK_ENQUEUE_FLAGS_NO_WAIT,
                1, &marker_event, NULL);
        release_event(evt);
}
```

FIG. 11

ENQUEUING KERNELS FROM KERNELS ON GPU/CPU

BACKGROUND

This disclosure relates generally to the field of computer programming. More particularly, but not by way of limitation, it relates to an execution model for allowing a graphics processor unit (GPU) to enqueue kernels for execution on the GPU.

As GPUs continue to evolve into high performance parallel compute devices, more and more applications are written to perform parallel computations in GPUs similar to general purpose compute devices. Today, those applications are limited because the execution model used by compute systems employing GPUs requires all work to be processed on the GPU to be created by a host processor. The GPU cannot create work for itself.

Standards have evolved for programming high-performance compute systems incorporating CPUs and GPUs. One such standard is the OpenCL (Open Computing Language) industry standard, which is an open, royalty-free standard for general-purpose parallel programming of heterogeneous systems, which may be used in personal computers, servers, and handheld or embedded devices. These standards provide an execution model to enable programmers to write code with enhanced performance and functionality.

SUMMARY

Graphics processing units (GPUs) and other compute units are allowed to enqueue tasks for themselves by themselves, without needing a host processor to queue the work for the GPU. Built-in functions enable kernels to enqueue kernels for execution on a device. In some embodiments, ndrange kernels execute over an N-dimensional range to provide data-parallel operations. Task kernels provide task-parallel operations. In some embodiments, kernels may be defined using clang block syntax.

The order of execution of commands on a computer unit may be constrained or allow execution of commands out-of-order. Compute units may control when kernels enqueued by the compute unit begins execution.

BRIEF DESCRIPTION OF THE DRAWINGS

FIG. 8 is a code segment illustrating some examples of ndrange and task kernels according to one embodiment.

FIG. 9 is a code segment illustrating an iterative algorithm in which a kernel enqueues additional kernels according to one embodiment.

FIG. 10 is code segment illustrating how events can be used with kernels enqueued on a device in different queues.

FIG. 11 is a code segment illustrating how a marker command can be used with kernels enqueued on a device in out-of-order queues.

DETAILED DESCRIPTION

Figure 1:
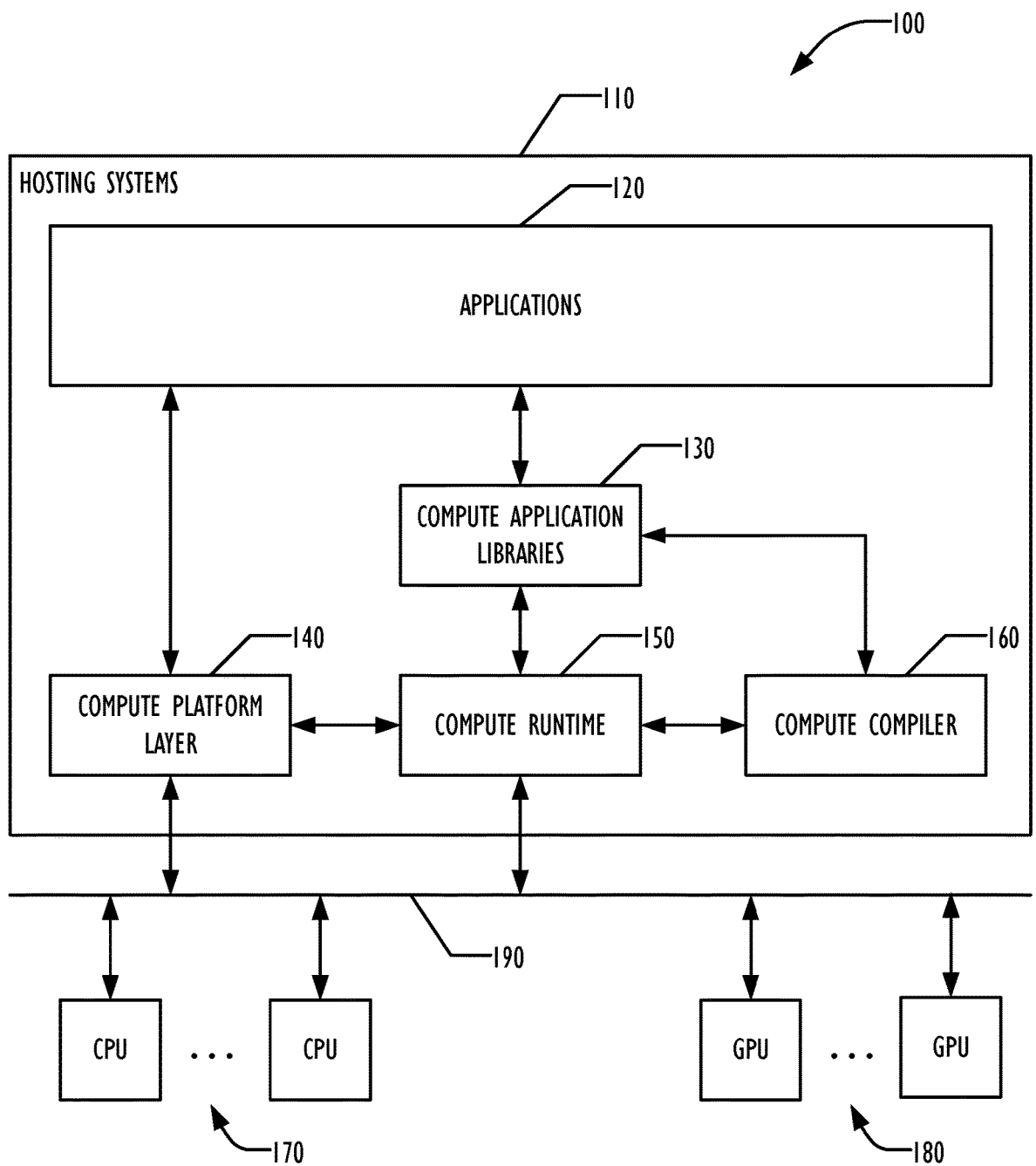
FIG. 1 is a block diagram illustrating an example of a system that uses computing devices including CPUs and/or GPUs to perform parallel computing for applications.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The processes depicted in the figures that follow are performed by processing logic that comprises hardware (e.g., circuitry, dedicated logic, etc.), software (such as is run on a general purpose computer or a dedicated machine), or a combination of both. Although the processes are described below in terms of some sequential operations, some of the operations described may be performed in different order, and some operations may be performed in parallel rather than sequentially.

A Graphics Processing Unit (GPU) may be a dedicated graphics processor implementing highly efficient graphics operations, such as 2D, 3D graphics operations and/or digital video related functions. A GPU may include special (programmable) hardware to perform graphics operations, e.g., blitter operations, texture mapping, polygon rendering, pixel shading, and vertex shading. GPUs are known to fetch data from a frame buffer and blend pixels together to render an image back into the frame buffer for display. GPUs may also control the frame buffer and allow the frame buffer to be used to refresh a display, such as a CRT or LCD display. Conventionally, GPUs may take graphics processing tasks from one or more central processing units (CPUs) coupled with the GPUs to output raster graphics images to display devices through display controllers.

A typical GPU is typically a Single Instruction Multiple Data (SIMD) device in which each instruction may operate on multiple pieces of data in parallel. Just as CPUs have developed from single processing units to multiple core processor that can execute instructions separately in each core, more recent GPUs provide "lanes" of vector computation, each of which can be interpreted as a separate work-item. A single hardware sequencer typically operates on a group of such work-items in parallel. If all execute the same instruction, they are said to be coherent. A single instruction fetch is broadcast to all of the individual processing elements. If the work-items branch in different directions, they are said to be diverged. The single instruction sequencer keeps track of which have diverged. It fetches a single instruction per cycle, and distributes it to all of those processing elements enabled by the mask.

FIG. 1 is a block diagram illustrating one embodiment of a system 100 that uses computing devices including CPUs and/or GPUs to perform parallel computing for applications. System 100 may implement a parallel computing architecture. In one embodiment, system 100 may be a graphics system including one or more host processors coupled with one or more CPUs 170 and one or more GPUs 180 through a data bus 190. The plurality of host processors may be networked together in a host system 110. The plurality of CPUs 170 may include multi-core CPUs from different vendors. A compute processor or compute unit, such as CPU or GPU, may be associated a group of capabilities. For example, a GPU may have dedicated texture rendering hardware. Another media processor may be a GPU supporting both dedicated texture rendering hardware and double precision floating point arithmetic. Multiple GPU s may be connected together.

In one embodiment, the host systems 110 may support a software stack. The software stack can include software stack components such as applications 120, compute application libraries 130, a compute platform layer 140, e.g. an OpenCL platform, a compute runtime layer 150, and a compute compiler 160. An application 120 may interface with other stack components through API calls. One or more processing elements or work-items may be running concurrently for the application 120 in the host systems 110. The compute platform layer 140 may maintain a data structure, or a computing device data structure, storing processing capabilities for each attached physical computing device. In one embodiment, an application may retrieve information about available processing resources of the host systems 110 through the compute platform layer 140. An application may select and specify capability requirements for performing a processing task through the compute platform layer 140. Accordingly, the compute platform layer 140 may determine a configuration for physical computing devices to allocate and initialize processing resources from the attached CPUs 170 and/or GPUs 180 for the processing task.

The compute runtime layer 150 may manage the execution of a processing task according to the configured processing resources for an application 120, for example, based on one or more logical computing devices. In one embodiment, executing a processing task may include creating a compute program object representing the processing task and allocating memory resources, e.g. for holding executables, input/output data etc. An executable loaded for a compute program object may be a compute program executable. A compute program executable may be included in a compute program object to be executed in a compute processor or a compute unit, such as a CPU or a GPU. The compute runtime layer 150 may interact with the allocated physical devices to carry out the actual execution of the processing task. In one embodiment, the compute runtime layer 150 may coordinate executing multiple processing tasks from different applications according to run time states of each processor, such as CPU or GPU configured for the processing tasks. The compute runtime layer 150 may select, based on the run time states, one or more processors from the physical computing devices configured to perform the processing tasks. Performing a processing task may include executing multiple work-items of one or more executables in a plurality of physical computing devices concurrently. In one embodiment, the compute runtime layer 150 may track the status of each executed processing task by monitoring the run time execution status of each processor.

The runtime layer may load one or more executables as compute program executables corresponding to a processing task from the application 120. In one embodiment, the compute runtime layer 150 automatically loads additional executables required to perform a processing task from the compute application library 130. The compute runtime layer 150 may load both an executable and its corresponding source program for a compute program object from the application 120 or the compute application library 130. A source program for a compute program object may be a compute program source. A plurality of executables based on a single compute program source may be loaded according to a logical computing device configured to include multiple types and/or different versions of physical computing devices. In one embodiment, the compute runtime layer 150 may activate the compute compiler 160 to online compile a loaded source program into an executable optimized for a target processor, e.g. a CPU or a GPU, configured to execute the executable.

An online compiled executable may be stored for future invocation in addition to existing executables according to a corresponding source program. In addition, the executables may be compiled offline and loaded to the compute runtime 150 using API calls. The compute application library 130 and/or application 120 may load an associated executable in response to library API requests from an application. Newly compiled executables may be dynamically updated for the compute application library 130 or for the application 120. In one embodiment, the compute runtime 150 may replace an existing compute program executable in an application by a new executable online compiled through the compute compiler 160 for a newly upgraded version of computing device. The compute runtime 150 may insert a new executable online compiled to update the compute application library 130. In one embodiment, the compute runtime 150 may invoke the compute compiler 160 when loading an executable for a processing task. In another embodiment, the compute compiler 160 may be invoked offline to build executables for the compute application library 130. The compute compiler 160 may compile and link a compute kernel program to generate a compute program executable. In one embodiment, the compute application library 130 may include a plurality of functions to support, for example, development toolkits and/or image processing. Each library function may correspond to a compute program source and one or more compute program executables stored in the compute application library 130 for a plurality of physical computing devices.

Figure 2:
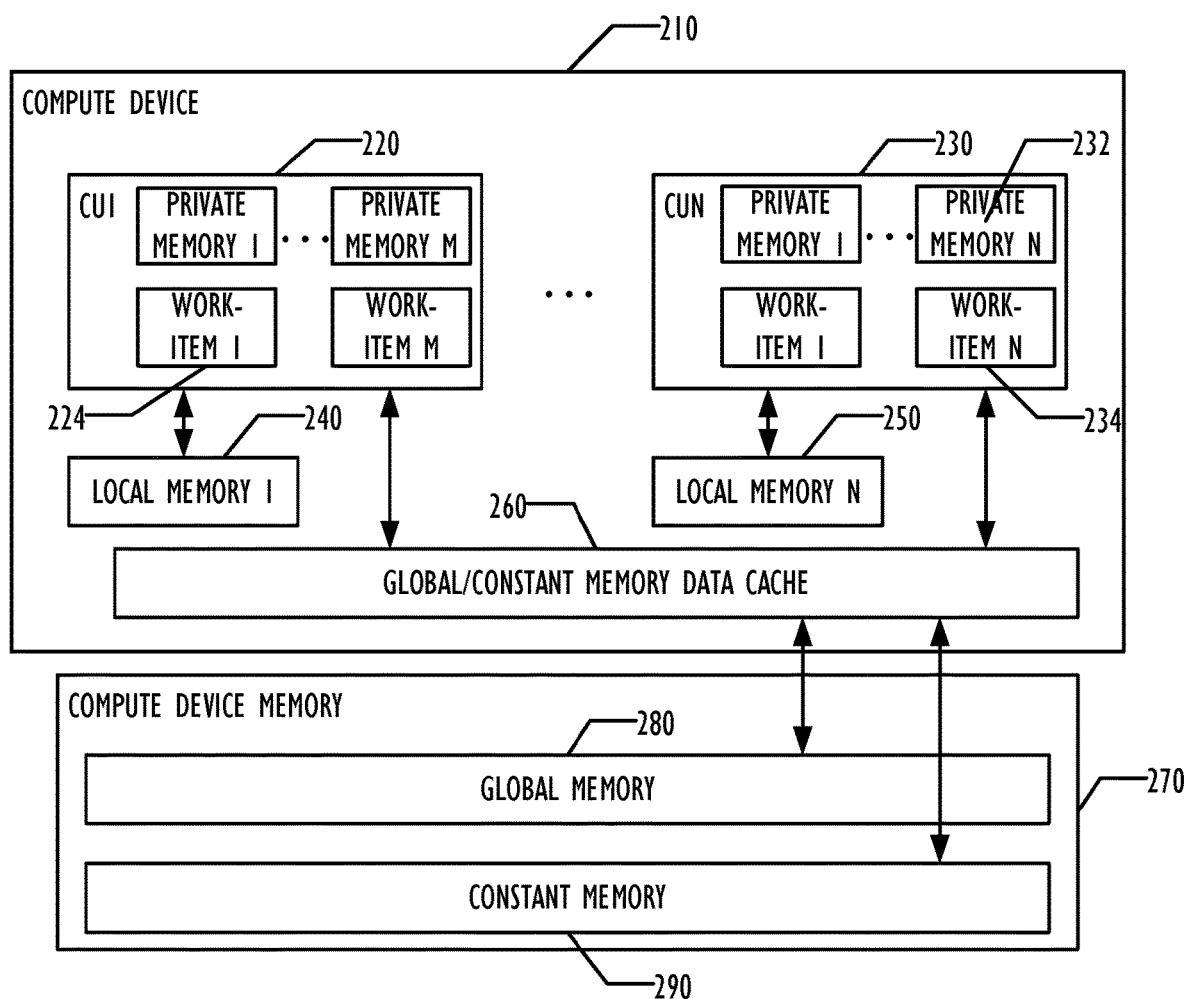
FIG. 2 is a block diagram illustrating an example of a computing device with multiple compute processors (e.g. compute units) operating in parallel to execute multiple work-items concurrently.

FIG. 2 is a block diagram illustrating an example of a computing device with multiple compute processors (e.g. compute units) operating in parallel to execute multiple work-items concurrently. Each compute processor may execute a plurality of work-items in parallel (or concurrently). Work-items that can be executed in parallel in a compute processor or compute unit may be referred to as a work-item group. A computing processor may have multiple work-item groups that may be executed in parallel. For example, M work-items are shown to execute as a work-item group in compute processor 220. Multiple work-item groups, e.g. work-item 1 of compute processor 1 220 and work-item N of compute processor N 230, may execute in parallel across separate compute processors on one computing device 210 or across multiple computing devices 210. A plurality of work-item groups across multiple compute processors may execute a compute program executable in parallel. More than one compute processors may be based on a single chip, such as an ASIC (Application Specific Integrated Circuit) device. In one embodiment, multiple work-items from an application may be executed concurrently in more than one compute processors across multiple chips.

The computing device 210 may include one or more compute processors or compute units such as CPU 220 and compute processor 230, which may be any combination of CPUs and GPUs. A local memory 240 may be coupled with a compute processor and shared among work-items in a single work-item group running in a compute processor. Multiple work-items from across different work-item groups, such as work-item 1 224 and work-item N 234, may share a compute memory object, such as a stream, stored in a computing device memory 270 coupled to the computing device 210. The computing device memory 270 may include a global memory 280 and a constant memory 290. The global memory 280 may be used to allocate compute memory objects, such as streams. A compute memory object may include a collection of data elements that can be operated on by a compute program executable. A compute memory object may represent an image, a texture, a framebuffer, an array of a scalar data type, an array of a user-defined structure, or a variable, etc. The constant memory 290 may be read-only memory storing constant variables frequently used by a compute program executable.

In one embodiment, local memory for a compute processor or compute unit may be used to allocate variables shared by all work-items in a work-item group. The local memory may be implemented as a dedicated local storage, such as local shared memory 240 for CPU 220 and local shared memory 250 for compute processor 230. In another embodiment, a local memory for a compute processor may be implemented as a read-write cache for a computing device memory for one or more compute processors of a computing device, such as data cache 260 for compute processors 220 and 230 in the computing device 210. A dedicated local storage may not be shared by work-items across different work-item groups. If the local memory of a compute processor, such as CPU 220 is implemented as a read-write cache, e.g. data cache 260, a variable declared to be in the local memory may be allocated from the computing device memory 270 and cached in the read-write cache, e.g. data cache 260, that implements the local memory. Work-items within a work-item group may share local variables allocated in the computing device memory 270 when, for example, neither a read-write cache 260 nor dedicated local storage 240, 250 are available for the corresponding compute processor 220, 230. In one embodiment, each work-item may be associated with a private memory to store work-item private variables that are used by functions called in the work-item. For example, private memory N 232 may not be seen by work-items other than work-item N 234.

Embodiments described herein provide an improved execution model. These improvements include better support for task-parallelism and for enabling kernels to directly enqueue kernels. These improvements offer programmer ease of use as well as new performance opportunities. As described herein, these improvements are written in terms of changes to the OpenCL runtime API and the language (OpenCL C) to support these execution model improvements. However, they are not limited to OpenCL and may be implemented in other execution models and standards as desired.

As used herein, a kernel is an OpenCL C function declared in a program or a built-in kernel executed on an OpenCL device. A kernel in a program is identified by the kernel qualifier applied to any function that is defined in the program. A kernel can be a nd-range data-parallel or task-parallel function. Also refer to data-parallel kernel, task-parallel kernel and built-in kernel.

A data-parallel kernel is an OpenCL C function declared with the kernel ndrange qualifier. A data-parallel kernel is also referred to as an nd-range kernel. A data-parallel kernel executes over an nd-range. A work-item executes an instance of the nd-range. Multiple work-items can be grouped together in a work-group, which are executed on a compute unit of an OpenCL device. Work-items in a work-group have shared access to local memory and all work-items across work-groups have shared access to global memory. Also refer to kernel, work-items and work-groups.

A task-parallel kernel (also referred to as a task) is an OpenCL C function declared with the kernel task qualifier. Tasks execute independently of other tasks, have exclusive access to local memory resources and shared access to global memory.

An nd-range defines how an OpenCL device should instance a data-parallel kernel for execution. nd-ranges are subdivided into work-groups which iterate over work-items instances of kernels. Also refer to kernel and data-parallel kernel.

The techniques described herein as implemented in an OpenCL environment maintain backward compatibility so applications written to prior OpenCL environments and standards continue to work. However, application developers can re-express existing applications or write new applications to take advantage of the execution model improvements to improve programmer ease of use and to improve performance of difficult to express execution patterns.

Support for Tasks

The OpenCL 1.x API provides a runtime API to enqueue a task (clEnqueueTask). In practice, this is simply a degenerate case of a data-parallel kernel and provides minimal additional value to end-users (who can just call clEnqueueNDRangeKernel with work_dim=1 and global_work_size[0]=1). The techniques described below allow both data- and task-parallel kernels to be first class citizens.

The techniques described herein introduce a more capable "task" model. From a programmer's perspective, a task operates much like a workgroup with only 1 work item. Vectorization may be either explicit (e.g. by using vector types) or via a vectorizing compiler (which, for example, may parallelize for-loops). This is in contrast to an ndrange, which may execute within a SIMD lane. One or more tasks may run concurrently.

Enqueuing Kernels from an OpenCL Device

In OpenCL 1.x, kernels are enqueued by an application 120 running on the host 110. The application queues a data-parallel kernel for execution on a compute device using the clEnqueueNDRangeKernel or clEnqueueTask API.

There are a number of use cases that benefit from the ability of kernels to directly enqueue kernels without host involvement. These use cases include: (a) the range is not known until after another kernel completes; and (b) the specific kernels to be enqueued depends on the results of a kernel. Iterative algorithms are a very common example of this use case where the ability to launch kernels from a kernel is quite important.

Without this enqueue ability, only the host 110 can queue kernels. This requires a potentially expensive (in terms of time and/or power) round-trip to the host 110 which must: 1)

wait until the queued kernels have finished execution, 2) read required generated data over a possibly slower memory bus and 3) determine what additional kernels need to be queued (and their ranges and arguments). This new enqueue ability can also reduce overall application code complexity since execution dependencies can be directly expressed in device code rather than fractured across host and device code.

Complex Application Execution Graphs

Many applications (for example game engines, complex media pipelines) implement complex execution graphs that mix sequential code, data-parallel code, and task-parallel code into complex event dependency chains. Today, application developers must create custom application-level mechanisms to implement event dependencies, execution control, and resource management across these different programming paradigms. For example, an application programmer must struggle to coordinate independently implemented systems such as a TBB style or Grand Central Dispatch task system and an OpenCL data-parallel kernel system to ensure that they interoperate and share execution resources. Such application work can be quite inelegant and cumbersome. Because dependencies are implemented at the application level, rather than the system level, they can quickly lead to inefficient use of CPU and GPU execution resources.

Execution Model

Execution of an OpenCL program occurs in two parts: kernels that execute on one or more OpenCL devices and a host program that executes on the host. The host program defines the context for the kernels and manages their execution.

The core of the OpenCL execution model is defined by how the kernels execute. A kernel can be enqueued for execution by the host or by a kernel executing on a device. When a kernel is submitted for execution an index space is defined. An instance of the kernel executes for each point in this index space. This kernel instance is called a work-item and is identified by its point in the index space, which provides a global ID for the work-item. Each work-item executes the same code but the specific execution pathway through the code and the data operated upon can vary per work-item.

Work-items are organized into work-groups. The work-groups provide a more coarse-grained decomposition of the index space. Work-groups are assigned a unique work-group ID with the same dimensionality as the index space used for the work-items. Work-items are assigned a unique local ID within a work-group so that a single work-item can be uniquely identified by its global ID or by a combination of its local ID and work-group ID. The work-items in a given work-group execute concurrently on the processing elements of a single compute unit.

The index space supported in OpenCL is called an NDRange. An NDRange is an N-dimensional index space, where N is one, two or three. An NDRange is defined by an integer array of length N specifying the extent of the index space in each dimension starting at an offset index F (zero by default). Each work-item's global ID and local ID are N-dimensional tuples. The global ID components are values in the range from F to (F plus the number of elements in that dimension minus one).

Work-groups are assigned IDs using a similar approach to that used for work-item global IDs. An array of length N defines the number of work-groups in each dimension. Work-items are assigned to a work-group and given a local ID with components in the range from zero to the size of the work-group in that dimension minus one. Hence, the combination of a work-group ID and the local-ID within a work-group uniquely defines a work-item. Each work-item is identifiable in two ways; in terms of a global index, and in terms of a work-group index plus a local index within a work group.

Figure 3:
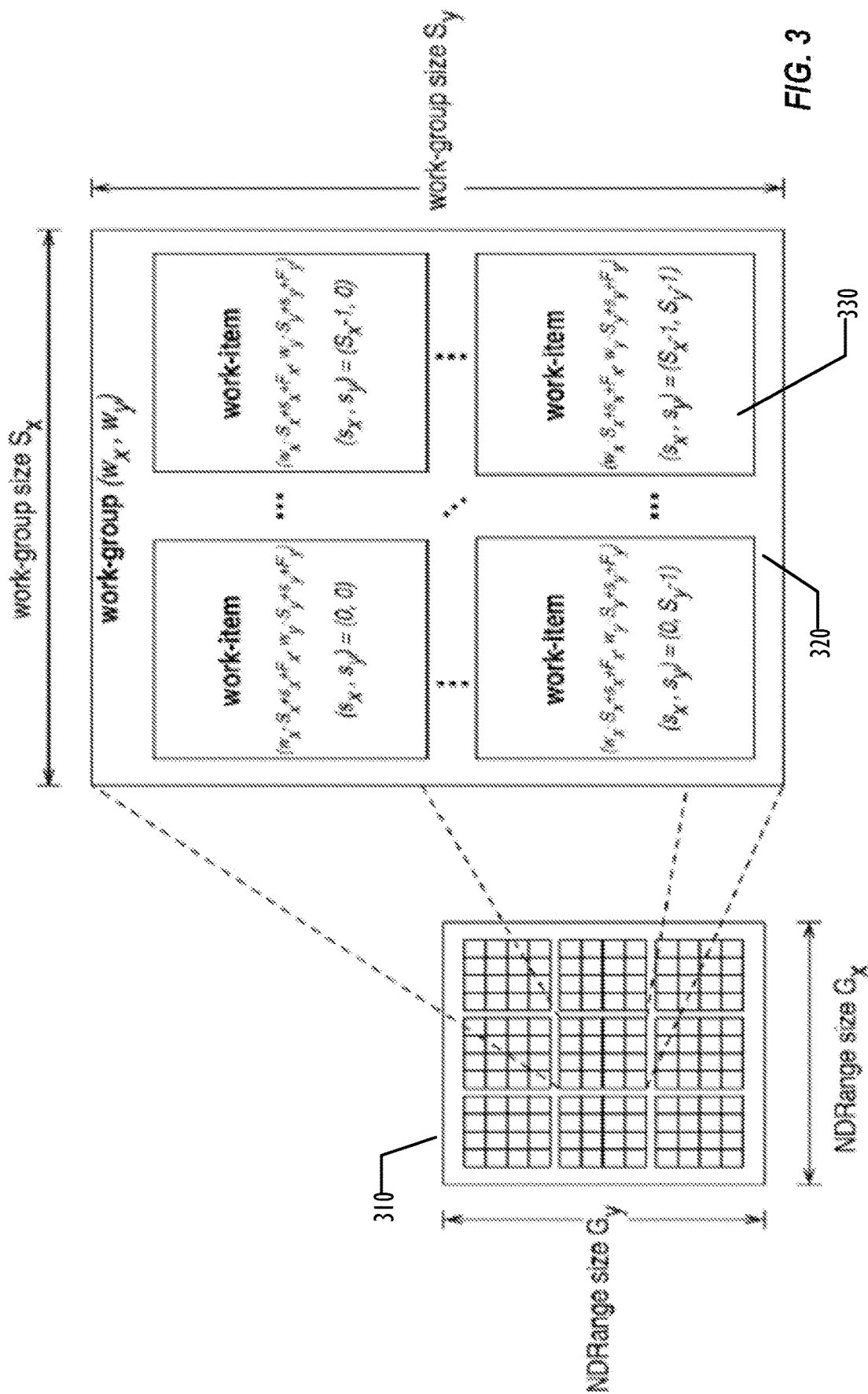
FIG. 3 a block diagram illustrating a 2-dimensional index space according to one embodiment.

For example, consider the 2-dimensional index space 310 in FIG. 3, which is an example of an NDRange index space showing work-items, their global IDs and their mapping onto the pair of work-group and local IDs. We input the index space 310 for the work-items (Gx, Gy), the size of each work-group (Sx, Sy) and the global ID offset (Fx, Fy). The global indices define a Gx by Gy index space 310 where the total number of work-items 330 is the product of Gx and Gy. The local indices define an Sx by Sy work-group 320 where the number of work-items 330 in a single work-group 320 is the product of Sx and Sy. Given the size of each work-group 320 and the total number of work-items 330 we can compute the number of work-groups. A 2-dimensional index space is used to uniquely identify a work-group 320. Each work-item 330 is identified by its global ID (gx, gy) or by the combination of the work-group ID (wx, wy), the size of each work-group (Sx, Sy) and the local ID (sx, sy) inside the work-group such that $$(g_x, g_y) = (w_x * S_x + s_x + F_x, w_y * S_y + s_y + F_y)$$

The number of work-groups can be computed as:

$$(W_x, W_y) = \left(\frac{G_x}{S_x}, \frac{G_y}{S_y}\right)$$

Given a global ID and the work-group size, the work-group ID for a work-item is computed as:

$$(w_x, w_y) = \left(\frac{(g_z - s_x - F_x)}{S_x}, \frac{(g_y - s_y - F_y)}{S_y}\right)$$

A wide range of programming models can be mapped onto this execution model. Two of these models are disclosed below: the data parallel programming model and the task parallel programming model.

Execution Model: Context and Command Queues

The host defines a context for the execution of the kernels. The context includes the following resources:

1. Devices: The collection of OpenCL devices to be used by the host.

2. Kernels: The OpenCL functions that run on OpenCL devices.

3. Program Objects: The program source and executable that implement the kernels.

4. Memory Objects: A set of memory objects visible to the host and the OpenCL devices. Memory objects contain values that can be operated on by instances of a kernel.

The context is created and manipulated by the host using functions from the OpenCL API. The host creates a data structure called a command-queue to coordinate execution of the kernels on the devices. The command-queue can be a host side queue or a device side queue. The host queues commands into the host side command-queue, which are then scheduled onto the devices within the context. These include:

1. Kernel execution commands: Execute a kernel on the processing elements of a device.

2. Memory commands: Transfer data to, from, or between memory objects, or map and unmap memory objects from the host address space.

3. Synchronization commands: Constrain the order of execution of commands.

Kernels executing on a device can queue commands into the device command-queue, which are then scheduled on the device within the context. These include:

1. Kernel execution commands: Execute a kernel on the processing elements of a device.

2. Synchronization commands: Constrain the order of execution of commands.

The command-queue schedules commands for execution on a device. These execute asynchronously between the host and the device. Commands execute relative to each other in one of two modes:

1. In-order Execution: Commands are launched in the order they appear in the command-queue and complete in order. In other words, a prior command on the queue completes before the following command begins. This serializes the execution order of commands in a queue.

2. Out-of-order Execution: Commands are issued in order, but do not wait to complete before following commands execute. Any order constraints are enforced by the programmer through explicit synchronization commands.

Commands submitted to a queue generate event objects. These are used to control execution between commands and to coordinate execution between the host and devices or multiple queues of a device.

It is possible to associate multiple command-queues with a single context. These queues run concurrently and independently with no explicit mechanisms within OpenCL to synchronize between them.

Execution Model: Categories of Kernels

The OpenCL execution model supports two categories of kernels:

1. OpenCL kernels are written with the OpenCL C programming language and compiled with the OpenCL compiler. All OpenCL implementations support OpenCL kernels. Implementations may provide other mechanisms for creating OpenCL kernels.

Built-in kernels are kernels that are executed on an OpenCL or custom device by fixed function hardware or by firmware.

2. Native kernels are accessed through a host function pointer. Native kernels are queued for execution along with OpenCL kernels on a device and share memory objects with OpenCL kernels. For example, these native kernels could be functions defined in application code or exported from a library. The ability to execute native kernels is an optional functionality and the semantics of native kernels are implementation-defined. The OpenCL API includes functions to query capabilities of a device(s) and determine if this capability is supported ND-Range and Task-Parallel Kernels OpenCL C functions can be categorized as data-parallel or task-parallel functions. In OpenCL 1.x, there is no clear distinction between these two types of OpenCL C functions and both are called "kernels." The OpenCL C kernel qualifier identifies a function declared in OpenCL program source to be a kernel function but it does not distinguish whether this is a data-parallel or task-parallel kernel. Since OpenCL 1.x primarily implements a data-parallel execution model, the kernel qualifier typically refers to data-parallel kernels enqueued by the host using clEnqueueNDRangeKernel. Data-parallel kernels execute over a N-dimensional range and hence referred to as nd-range kernels herein.

As used herein, the definition of "kernel" is tightened to simply mean "exported OpenCL C function" and two new kernel qualifiers are introduced: task and ndrange. A data-parallel function executes over an N-dimensional range and hence is referred to as an "ndrange" and is exported with the qualifier "kernel ndrange", while a task-parallel function is referred to as a "task" and is exported with the qualifier "kernel task."

If the ndrange or task qualifier is not specified with the kernel qualifier, the ndrange qualifier is assumed as the default; this assumption maintains consistency with OpenCL 1.x behavior and semantics of the kernel function qualifier. Preferably, compilers warn as an anachronism if programmers do not specify ndrange or task.

An advantage of this approach is that the host code and host APIs for OpenCL applications remains largely generic with respect to OpenCL C kernel functions. It can continue the OpenCL 1.x syntax of managing all exported OpenCL C functions generically with handles of type cl_kernel.

The rules described in the OpenCL 1.2 specification for functions declared with the kernel qualifier also apply to functions declared with the kernel ndrange or kernel task qualifiers. In addition, variables used by a kernel task kernel that are allocated in the local address space are not shared across multiple task instances.

Describing the ND-Range for an OpenCL Kernel

Figure 4:
FIG. 4 is a code segment illustrating an nd-range data structure according to one embodiment.

The nd-range data structure is used to describe the range over which to execute a kernel. This data structure is supported by the OpenCL runtime APIs and is defined as illustrated by the code segment 400 in FIG. 4.

A local_work_size[0] . . . local_work_size[work_dim−1] of 0 is equivalent to passing NULL to the local_work_size argument to clEnqueueNDRangeKernel in OpenCL 1.2.

New APIs

A new runtime API is defined for creating a host or on-device command-queue. The existing OpenCL 1.x API clCreateCommandQueue should be deprecated.

Figure 5:
FIG. 5 is a code segment illustrating a function to create a command queue according to one embodiment.

The function 500 illustrated in FIG. 5 creates a host or on-device command queue for device identified by device_id, where properties specifies a list of context property names and their corresponding values. Each property name is immediately followed by the corresponding desired value. The list is terminated with 0. The list of supported properties is described in Table 1 below. properties can be NULL in which case the platform that is selected is implementation-defined.

TABLE 1

| cl_command_queue properties num | Property value | Description |
|---|---|---|
| CL_QUEUE_PROPERTIES | cl_bitfield | This is a bitfield and can be set to a combination of the following values: CL_QUEUE_OUT_OF_ORDER_EXEC_MODE_ENABLE CL_QUEUE_PROFILING_ENABLE CL_QUEUE_DEVICE-indicates that this is an on-device queue. |

TABLE 1-continued

| cl_command_queue properties num | Property value | Description |
|---|---|---|
| CL_QUEUE_SIZE | cl_uint | Specifies the maximum number of commands that a device queue holds. This can only be specified if CL_QUEUE_DEVICE is set in CL_QUEUE_PROPERTIES. This must be a value <= CL_DEVICE_MAX_QUEUE_SIZE. For best performance, this should be <= CL_DEVICE_PREFERRED_QUEUE_SIZE. If CL_QUEUE_SIZE is not specified, the device queue is created with CL_DEVICE_PREFERRED_QUEUE_SIZE as the size of the queue. |

OpenCL implementations typically provide a default (in-order) device queue that can be used to enqueue kernels on the device. The size of this default device queue can be queried using the CL_DEVICE_DEFAULT_QUEUE_SIZE enum described in the table below.

Table 2 below sets forth additional device properties over what are defined in the OpenCL 1.2 specification.

TABLE 2

| cl_device_info | Return Type | Description |
|---|---|---|
| CL_DEVICE_PREFERRED_QUEUE_SIZE | cl_uint | The preferred size of the queue in bytes. The minimum value is 4 KB for devices that are not of type CL_DEVICE_TYPE_CUSTOM. |
| CL_DEVICE_DEFAULT_QUEUE_SIZE | cl_uint | The size of the default queue (created by the implementation) in bytes. |
| CL_DEVICE_MAX_QUEUE_SIZE | cl_uint | The max size of the queue in bytes. The minimum value is 64 KB for devices that are not of type CL_DEVICE_TYPE_CUSTOM. |
| CL_DEVICE_MAX_QUEUES | cl_uint | The maximum number of on-device queues that can be created per context. The minimum value is 4 for devices that are not of type CL_DEVICE_TYPE_CUSTOM. |
| CL_DEVICE_MAX_EVENTS_ON_DEVICE | cl_uint | The maximum number of events in use by a device queue. These refer to events returned by enqueue_kernel built-in functions to a device queue or user events returned by the create_user_event built-in function that have not been released. The minimum value is 32 for in-order device queues and 256 for out-of-order device queues. |
| CL_DEVICE_TASK_LOCAL_MEM_SIZE | cl_ulong | Size of local memory arena in bytes available to task kernels i.e. kernels declared with the kernel task qualifier. The minimum value is 8 KB for devices that are not of type CL_DEVICE_TYPE_CUSTOM. CL_DEVICE_LOCAL_MEM_SIZE now refers to the size of local memory for data-parallel kernels i.e. kernels declared with the kernel ndrange qualifier. |

The following new APIs are provided in the OpenCL runtime for enqueuing kernels. The existing OpenCL 1.x APIs clEnqueueNDRangeKernel and clEnqueueTask are preferably deprecated. Instead the following new API should be used to enqueue nd-range and task-parallel kernels.

Figure 6:
FIG. 6 is a code segment illustrating a function that enqueues an nd-range or task-parallel kernel according to one embodiment.

The function 600 illustrated in FIG. 6 enqueues an nd-range or task-parallel kernel. flags must be CL_KERNEL_EXEC_NDRANGE (which is the default) indicating that the kernel executes over an ND-range. kernel_exec_desc should be a pointer to a cl_ndrange data structure that describes the ND-range over which a kernel executes. kernel can be an ndrange, task, or built-in kernel.

For nd-range kernels, the behavior is similar to that described by clEnqueueNDRangeKernel in the OpenCL 1.x specification. ndrange specifies the ND-range that was described by the work_dim, global_work_offset, global_work_size and local_work_size arguments to clEnqueueNDRangeKernel.

For task-parallel kernels, ndrange can be NULL or ndrange.work_dim must be 1 and ndrange.global_work_size[0] determines whether a single instance or multiple instances of a task-parallel kernel are enqueued. In the case where multiple instances of a task-parallel kernel are enqueued by clEnqueueKernel, the task instances are considered to be independent tasks executing in parallel and execute in no pre-determined order. The execution of these tasks is not associated together in a work-group(s) and they do not share local memory between task instances. The tasks instances specified by ndrange.global_work_size[0] to clEnqueueKernel must complete execution before the clEnqueueKernel command is considered complete. Each task instance gets a unique global ID whose values are between 0 and ndrange.global_work_size[0]−1.

Table 3 sets forth an additional query for use by clGetKernelInfo:

TABLE 3

| cl_kernel_info | Return Type | Info, returned in param_value |
|---|---|---|
| CL_KERNEL_TYPE | cl_kernel_type | Returns the following: CL_KERNEL_TYPE_NDRANGE if the function is declared with the kernel ndrange qualifier, or if it is a built-in nd-range kernel, CL_KERNEL_TYPE_TASK if the function is declared with the kernel task qualifier or if it is a built-in task-parallel kernel. |

Enqueuing Kernels from Kernels

OpenCL C adds new built-in functions that enable kernels to enqueue kernels for execution on a device. The kernel performing the enqueue is called a parent kernel and the kernel(s) being enqueued are called child kernel(s).

A new device command-queue is defined to receive commands when these new built-in functions enqueue kernels. These device command-queues are created on the host using clCreateCommandQueueWithProperties with properties set to {CL_QUEUE_PROPERTIES, CL_QUEUE_DEVICE}. Handles to such device command-queues can be passed as arguments to a kernel. These device command-queues support in-order execution. Optionally, out-of-order execution may also be supported.

ndrange- and task-parallel kernels can enqueue new ndrange- and/or task-parallel kernels. The enqueue operation is per work-item. The child kernels are limited to the memory objects (buffers and images) of the parent kernel.

Kernels can enqueue new kernels to be executed on the same device. The host 110 should be used to enqueue kernels across devices.

We now discuss the changes to OpenCL C that allow kernels (nd-range or task-parallel kernels) to enqueue new kernels.

New Data Types

Table 4 lists new supported data types.

TABLE 4

| Type | Description |
|---|---|
| queue_t | A device command-queue. This queue can only be used by commands executing on the device. This queue cannot be used by the OpenCL runtime to queue commands to a device. These device command queues support in-order and optionally out-of-order execution modes. |
| event_t | An OpenCL event. This is used to identify an enqueued command or a user event. The OpenCL 1.x event_t type that is used by the async_workgroup_copy and async_workgroup_strided_copy built-in functions is renamed to copy_event_t. |
| device_t | The OpenCL device ID. |
| ndrange_t | The N-dimensional space over which an nd-range kernel executes. |
| kernel_t | An OpenCL kernel. This describes the kernel and its associated argument values. |

Table 5 describes correspondence between the new data types of Table 4 and the data type available to the application 120:

TABLE 5

| Type in OpenCL C | API type for application |
|---|---|
| queue_t | cl_command_queue |
| event_t | cl_event |
| device_t | cl_device_id |
| ndrange_t | cl_ndrange |
| kernel_t | cl_kernel |

The following rules apply for these data types:

a. These data types can only be used as types for arguments to any function declared in the OpenCL program source.

b. Pointers to queue_t, event_t, device_t and ndrange_t data types are also allowed and can be used as type for arguments to any function declared in an OpenCL program source.

c. The behavior of applying the sizeof operator to the queue_t, event_t, device_t and kernel_t types is implementation-defined.

d. These data types cannot be used within a structure or union field declaration for arguments to a kernel function.

Describing the Nd-Range for an OpenCL Kernel

Figure 7:
FIG. 7 is a code segment illustrating an ndrange_t data structure according to one embodiment.

The ndrange_t data structure is supported by OpenCL C and describes the range over which to execute a kernel. This data structure 700 matches the cl_ndrange data structure described above and is illustrated in FIG. 7.

Built-in Functions—Enqueuing Kernels

Kernels are enqueued from kernels in OpenCL C by enqueuing a kernel object (kernel_t). The kernel object identifies the kernel function and its argument values. This kernel object:

1. can be created on the host using clCreateKernel and passed as an argument to a kernel function. The kernel object must have its argument values specified (using clSetKernelArg) before it can be passed as an argument to a kernel function.

2. is the return type of a function (generated by the compiler) that is used to specify the argument values and returns a kernel_t type. For each function declared with the kernel qualifier, the OpenCL C compiler generates a corresponding function that takes the same arguments as the kernel function and returns a kernel_t object. This function will have the same name as the kernel function name but with a create_kernel_prefix.

FIG. 8 is a code fragment 800 that illustrates some examples that describe these two supported methods. clEnqueueKernel returns CL_INVALID_KERNEL_ARGS for any argument declared to be of type kernel_t that does not have a cl_kernel object with all of its argument values specified.

Built-in Enqueue Functions

Table 6 describes the list of built-in functions that can be used to enqueue a kernel(s).

TABLE 6

| Built-in Function | Description |
|---|---|
| int enqueue_kernel ( queue_t queue, kernel_t kernel, kernel_enqueue_flags_t flags, const ndrange_t *ndrange) int enqueue_kernel ( queue_t queue, kernel_t kernel, kernel_enqueue_flags_t flags, | Enqueue an nd-range or task-parallel OpenCL C or built-in kernel identified by kernel_t for execution to queue. For nd-range kernels, ndrange specifies the ND-range over which the data-parallel kernel is to be executed in parallel. For task-parallel kernels, ndrange can be NULL or ndrange.work_dim must be 1 |

TABLE 6-continued

| Built-in Function | Description |
| --- | --- |
| const ndrange_t *ndrange, uint num_events_in_wait_list, const event_t *event_wait_list, event_t *event_ret); | and the value in ndrange.global_work_offset[0] determines whether a single instance or multiple instances of a task-parallel kernel are enqueued. If queue is NULL it refers to the default device queue. |

The enqueue_kernel built-in function allows a work-item to enqueue a kernel. Work-items can enqueue multiple kernels to a device queue(s). The device queue can refer to a queue on the device where the kernel doing the enqueue is executing or on another device. For example, consider a scenario where a kernel enqueues new kernels. The child kernels use double precision, which may not be supported by the device on which the parent kernel is executing. The parent kernel can enqueue the child kernels that require double precision to another device, which could be another GPU or the CPU.

The enqueue_kernel built-in function returns CL_SUCCESS if the kernel is enqueued successfully. Otherwise, it returns one of the following errors:

CL_INVALID_QUEUE if queue is not a valid device queue. CL_INVALID_WORK_DIMENSION if ndrange->work_dim is not a valid value (i.e. a value between 1 and 3) or if the enqueued is a task-parallel kernel and ndrange->work_dim is not 1.

CL_INVALID_GLOBAL_WORK_SIZE if any of the values specified in ndrange->global_work_size[0], . . . ndrange->global_work_size[ndrange->work_dim−1] are 0.

CL_INVALID_GLOBAL_WORK_OFFSET if the value specified in ndrange->global_work_size+the corresponding values in ndrange->global_work_offset for any dimension from 0 to ndrange->work_dim−1 is greater than the sizeof (size_t) for the device.

CL_INVALID_WORK_GROUP_SIZE if ndange->local_ work_size[0] is >0 and the enqueued kernel is a task-parallel kernel.

CL_INVALID_WORK_GROUP_SIZE if the enqueued kernel is a ND-range kernel and not all the values in ndange->local_work_size[0] . . . ndrange->local_work_size[ndrange->work_dim−1] are either zero or >0.

CL_INVALID_WORK_GROUP_SIZE if the total number of work-items in the work-group specified by ndange->local_work_size[0] . . . ndrange->local_work_size [ndrange->work_dim−1] is greater than the value specified by CL_DEVICE_MAX_WORK_GROUP_SIZE (refer to table 4.3 of the OpenCL 1.x specification).

CL_INVALID_WORK_ITEM_SIZE if the number of work-items specified in any of ndrange->local_work_size[0] . . . ndrange->local_work_size[work_dim−1] is greater than the corresponding values specified by CL_DEVICE_MAX_WORK_ITEM_SIZES[0], . . . CL_DEVICE_MAX_WORK_ITEM_SIZES[ndrange->work_dim−1].

CL_INVALID_EVENT_WAIT_LIST if event_wait_list is NULL and num_events_in_wait_list>0, or if event_wait_list is not NULL and num_events_in_wait_list is 0, or if event objects in event_wait_list are not valid events.

CL_DEVICE_QUEUE_FULL if the device queue specified by queue is full.

CL_EVENT_ALLOCATION_FAILURE if event_ret is not NULL and an event could not be allocated.

CL_OUT_OF_RESOURCES if there is a failure to queue the kernel on the device queue because of insufficient resources needed to execute the kernel.

A Complete Example

The example illustrated in FIG. 9 provides a code sample 900 that shows how to implement an iterative algorithm where the host enqueues the first instance of the nd-range kernel 910 (dp_func_A). The kernel 910 will launch a single task 920 (evaluate_dp_work_A) that will determine if new nd-range work needs to be performed. If new nd-range work does need to be performed, then kernel 920 will enqueue a new instance of kernel 910. This process is repeated until all the work is completed. A single task instance of task 920 is enqueued by kernel 910 for a given nd-range over which the nd-range kernel 910 executes.

Determining when a Child Kernel Begins Execution

The kernel_enqueue_flags_t argument to enqueue_kernel built-in functions can be used to specify when the child kernel begins execution. Supported values are described in Table 7 below:

TABLE 7

| kernel_enqueue_flags_t enum | Description |
| --- | --- |
| CLK_ENQUEUE_FLAGS_NO_WAIT | This is the default and indicates that the enqueued kernels do not need to wait for the parent kernel to finish execution before they begin execution. |
| CLK_ENQUEUE_FLAGS_WAIT_KERNEL | Indicates that the enqueued kernels wait for the parent kernel to finish execution before they begin execution. |
| CLK_ENQUEUE_FLAGS_WAIT_WORKGROUP | Indicates that the enqueued kernels wait only for the workgroup that enqueued the kernels to finish before they begin execution |

CL_INVALID_WORK_GROUP_SIZE if the number of work-items specified by ndrange->global_work_size is not evenly divisible by size of work-group given by ndrange->local_work_size4 or does not match the work-group size specified for the enqueued kernel using the __attribute__ ((reqd_work_group_size(X, Y, Z))) qualifier in the program source.

Determining when a Parent Kernel has Finished Execution

A parent kernel's execution status is considered to be complete when it and all its child kernels have finished execution. The execution status of a parent kernel will be CL_COMPLETE if this kernel and all its child kernels finish execution successfully. The execution status of the kernel will be an error code (given by a negative integer value) if it or any of its child kernels encounter an error, or are abnormally terminated.

Built-in Functions—Kernel Query Functions

Table 8 below illustrates a group of built-in kernel query functions:

TABLE 8

| Built-in Function | Description |
|---|---|
| size_t get_kernel_workgroup_size ( kernel_t kernel); | This provides a mechanism to query the maximum work-group size that can be used to execute a kernel on a specific device given by device. The OpenCL implementation uses the resource requirements of the kernel (register usage etc.) to determine what this work-group size should be. kernel specifies the kernel descriptor. The kernel function specified by the descriptor can be an nd-range or task-parallel OpenCL C or a built-in kernel. |
| size_t get_kernel_preferred_workgroup_size_multiple (kernel_t kernel); | Returns the preferred multiple of work-group size for launch. This is a performance hint. Specifying a work-group size that is not a multiple of the value returned by this query as the value of the local work size argument to enqueue_kernel will not fail to enqueue the kernel for execution unless the work-group size specified is larger than the device maximum. kernel specifies the kernel descriptor. The kernel function specified by the descriptor can be an nd-range or task-parallel OpenCL C or a built-in kernel. |
| size_t get_kernel_enqueue_size ( kernel_t kernel); | Returns the size of the command to enqueue kernel in bytes. |

Built-in Functions—Queuing Marker, Barrier Commands and Setting User Event Status Table 9 describes a list of built-in functions that can be used to enqueue commands such as a marker or a barrier.

TABLE 9

| Built-in Function | Description |
|---|---|
| int enqueue_barrier ( queue_t queue, uint num_events_in_wait_list, const event_t *event_wait_list, event_t *event_ret) | Enqueue a barrier command to queue. The barrier command waits for either a list of events to complete, or if the list is empty it waits for all commands previously enqueued in queue to complete before it completes. This command blocks command execution, that is, any following commands enqueued after it do not execute until it completes |
| int enqueue_marker ( queue_t queue, uint num_events_in_wait_list, const event_t *event_wait_list, event_t *event ret) | Enqueue a marker command to queue. The marker command waits for either a list of events to complete, or if the list is empty it waits for all commands previously enqueued in queue to complete before it completes |

The enqueue_marker and enqueue_barrier built-in functions return

CL_SUCCESS if these functions are executed successfully. Otherwise, it returns one of the following errors:

CL_INVALID_QUEUE if queue is not a valid device queue.

CL_INVALID_EVENT_WAIT_LIST if event_wait_list is NULL and num_events_in_wait_list>0, or if event_wait_list is not NULL and num_events_in_wait_list is 0, or if event objects in event_wait_list are not valid events.

CL_DEVICE_QUEUE_FULL if the device queue specified by queue is full.

CL_EVENT_ALLOCATION_FAILURE if event_ret is not NULL and an event could not be allocated.

CL_OUT_OF_RESOURCES if there is a failure to queue the kernel on the device queue because of insufficient resources needed to execute the kernel.

Some embodiments may provide a mechanism to identify the size of a barrier and marker command, similar to the kernel query functions described above in Table 8.

Built-in Functions—Event Functions

TABLE 10

| Built-in Function | Description |
|---|---|
| int retain_event (event_t event) | Increments the event reference count. event must be an event returned by enqueue_kernel. enqueue_kernel performs an implicit retain on any event they return. Returns CL_SUCCESS if retain_event was executed successfully. Otherwise, returns CL_INVALID_EVENT if event is not a valid event object. |
| int release_event (event_t event) | Decrements the event reference count. The event object is deleted once the event reference count is zero, the specific command identified by this event has completed (or terminated) and there are no commands in any device command queue that require a wait for this event to complete. event must be an event returned by enqueue_kernel. Returns CL_SUCCESS if release_event was executed successfully. Otherwise, returns CL_INVALID_EVENT if event is not a valid event object. |

TABLE 10-continued

| Built-in Function | Description |
| --- | --- |
| event_t create_user_event ( int *errcode_ret) | Create a user event. Returns a valid non-zero event object and errcode_ret if not NULL will be set to CL_SUCCESS. If user event could not be created, returns CL_EVENT_ALLOCATION_FAILURE in errcode_ret. The execution status of the user event created is set to CL_SUBMITTED. |
| int set_user_event_status ( event_t event, int status) | Sets the execution status of a user event, event must be a user-event, status can be either CL_COMPLETE or a negative integer value indicating an error. Returns CL_SUCCESS if set_user_event_status was executed successfully. Otherwise, returns CL_INVALID_EVENT if event is not a valid event object or CL_INVALID_VALUE if status is not CL_COMPLETE or a negative integer value. |
| int get_event_profiling_info ( event_t event, cl_profiling_info name, ulong *value) | Returns the profiling information for command associated with event. name can be one of the following literal values: CL_PROFILING_COMMAND_QUEUED CL_PROFILING_COMMAND_SUBMIT CL_PROFILING_COMMAND_START CL_PROFILING_COMMAND_END Returns CL_SUCCESS if get_event_profiling_info was executed successfully. Otherwise, returns CL_INVALID_EVENT if event is not a valid event object. |

Events can be used to identify commands enqueued to a command-queue from the host. These events created by the OpenCL runtime can only be used on the host i.e. as events passed in event_wait_list argument to various clEnqueue APIs or runtime APIs that take events as arguments such as clRetainEvent, clReleaseEvent, clGetEventProfilingInfo.

Similarly, events can be used to identify commands enqueued to a device queue (from a kernel). These event objects can only be used in built-in functions that enqueue commands to a device queue or built-in functions that take these device event objects as arguments.

clRetainEvent and clReleaseEvent will return CL_INVALID_OPERATION if event specified is an event that refers to any kernel enqueued to a device queue using enqueue_kernel or is a user event created by create_user_event.

Similarly, clSetUserEventStatus can only be used to set the execution status of events created using clCreateUserEvent. User events created on the device or on the host and passed to the kernel executing on a device can be set using set_user_event_status built-in function.

The example code fragment 1000 in FIG. 10 illustrates how events can be used with kernels enqueued on the device in different queues.

The example code fragment 1100 in FIG. 11 illustrates how the marker command can be used with kernels enqueued on the device in out-of-order queues.

Built-in Functions—Helper Functions

Table 11 illustrates a several helper built-in functions according to one embodiment.

TABLE 11

| Built-in Function | Description |
| --- | --- |
| queue_t get_default_queue (void) | Returns the default on-device queue. |
| size_t get_queue_size (queue_t q) | Returns the device queue size i.e. the size of the created device queue in bytes. |
| size_t get_queue_avail_size(queue_t q) | Returns the currently available size of the device queue. |
| ndrange_t get_ndrange (void) | Returns the ndrange_t specified for the currently executing kernel from where get_ndrange is called. |
| ndrange_t ndrange_1D ( size_t global_work_size) | Builds a 1D, 2D or 3D ND-range descriptor. |
| ndrange_t ndrange_1D ( size_t global_work_size, size_t local_work_size) | |
| ndrange_t ndrange_1D ( size_t global_work_offset, size_t global_work_size, size_t local_work_size) | |
| ndrange_t ndrange_2D ( size_t global_work_size[2]) | |
| ndrange_t ndrange_2D ( size_t global_work_size[2], size_t local_work_size[2]) | |
| ndrange_t ndrange_2D ( size_t global_work_offset[2], size_t global_work_size[2], size_t local_work_size[2]) | |
| ndrange_t ndrange_3D ( size_t global_work_size[3]) | |
| ndrange_t ndrange_3D ( size_t global_work_size[3], size_t local_work_size[3]) | |
| ndrange_t ndrange_3D ( size_t global_work_offset[3], size_t global_work_size[3], size_t local_work_size[3]) | |

Implementation in an Electronic Device

Figure 12:
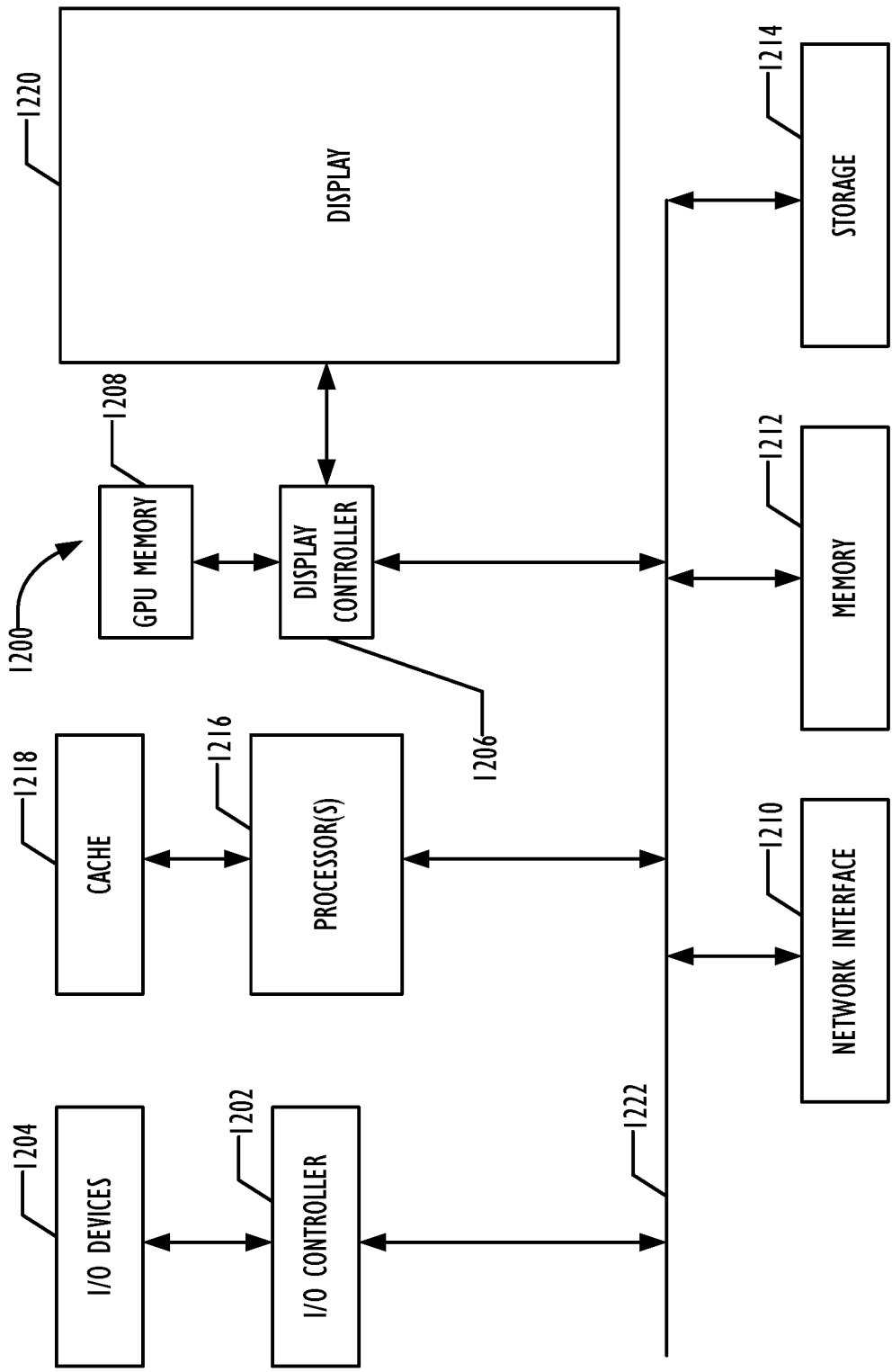
FIG. 12 is a block diagram illustrating a computer system for use according to one embodiment.

FIG. 12 shows one example of a computer system 1200 that can be used with one embodiment. For example, the system 1200 may be implemented as a part of the systems shown in FIG. 1. While FIG. 12 illustrates various components of a computer system, it is not intended to represent any particular architecture or manner of interconnecting the components as such details are not germane to the present disclosure. Network computers and other data processing systems (for example, handheld computers, personal digital assistants (PDAs), cellular telephones, entertainment systems, consumer electronic devices, etc.) which have fewer components or perhaps more components may also be used to implement one or more embodiments.

As shown in FIG. 12, the computer system 1200, which is a form of a data processing system, includes a bus 1222 which is coupled to a microprocessor(s) 1216, which may be CPUs and/or GPUs, a memory 1212, which may include one or both of a volatile read/write random access memory (RAM) and a read-only memory (ROM), and a non-volatile storage device 1214. The microprocessor(s) 1216 may retrieve instructions from the memory 1212 and the storage device 1214 and execute the instructions using cache 1218 to perform operations described above. The bus 1222 interconnects these various components together and also interconnects these components 1216, 1218, 1212, and 1214 to a display controller 1206 and display device 1220 and to peripheral devices such as input/output (I/O) devices 1204 which may be mice, keyboards, modems, network interfaces, printers and other devices which are well known in the art. Typically, the input/output devices 1204 are coupled to the system through input/output controllers 1202. Where volatile RAM is included in memory 1212, the RAM is typically implemented as dynamic RAM (DRAM) which requires power continually in order to refresh or maintain the data in the memory. The display controller 1206 and display device 1220 may optionally include one or more GPUs to process display data. Optionally, a GPU memory 1208 may be provided to support GPUs included in the display controller 1206 or display device 1220.

The storage device 1214 is typically a magnetic hard drive, an optical drive, a non-volatile solid-state memory device, or other types of memory systems which maintain data (e.g. large amounts of data) even after power is removed from the system. While FIG. 12 shows that the storage device 1214 is a local device coupled directly to the rest of the components in the data processing system, embodiments may utilize a non-volatile memory which is remote from the system, such as a network storage device which is coupled to the data processing system through a network interface 1210, which may be a wired or wireless networking interface. The bus 1222 may include one or more buses connected to each other through various bridges, controllers and/or adapters as is well known in the art. Although only a single element of each type is illustrated in FIG. 12 for clarity, multiple elements of any or all of the various element types may be used as desired.

Other embodiments of techniques for enqueuing kernels may use kernels that are defined using a clang block syntax.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A program storage device, on which are stored instructions, comprising instructions that when executed cause one or more compute units to:
enqueue a first kernel by a first compute unit for execution on a second compute unit, wherein the first and second compute units have different capabilities;
determine, based on the execution of the first kernel, that a condition is met; and
in response to the condition being met based on the execution of the first kernel, enqueue a second kernel for execution on the second compute unit.

2. The program storage device of claim 1, wherein the first compute unit is a central processing unit (CPU) and the second compute unit is a graphic processing unit (GPU).

3. The program storage device of claim 1, wherein the second kernel is enqueued after execution of the first kernel is complete.

4. The program storage device of claim 1, wherein the second kernel is enqueued during execution of the first kernel.

5. The program storage device of claim 1, wherein the first kernel is a data-parallel kernel, and wherein the second kernel is a data-parallel kernel with a different range than the first kernel.

6. The program storage device of claim 1, wherein the first kernel is a task-parallel kernel, and wherein the second kernel is a task-parallel kernel.

7. The program storage device of claim 1, wherein the first kernel is a task-parallel kernel, and wherein the second kernel is a data-parallel kernel.

8. The program storage device of claim 1, wherein the first kernel is a data-parallel kernel, and wherein the second kernel is a task-parallel kernel.

9. The program storage device of claim 1, wherein the second compute unit enqueues a barrier on a queue of commands to blocks execution of commands enqueued on the queue of commands after the barrier until the barrier completes.

10. The program storage device of claim 1, wherein the second compute unit enqueues a marker on a queue of commands that does not complete until one or more other commands completes.

11. A computing device, comprising:
one or more compute units; and
a global memory, coupled to the one or more compute units, on which are stored instructions that when executed cause the one or more compute units to:
enqueue a first kernel by a first compute unit for execution on a second compute unit, wherein the first and second compute units have different capabilities;
determine, based on the execution of the first kernel, that a condition is met; and
in response to the condition being met based on the execution of the first kernel, enqueue a second kernel for execution on the second compute unit.

12. The computing device of claim 11, wherein the first compute unit is a central processing unit (CPU) and the second compute unit is a graphic processing unit (GPU).

13. The computing device of claim 11, wherein the second kernel is enqueued after execution of the first kernel is complete.

14. The computing device of claim 11, wherein the second kernel is enqueued during execution of the first kernel.

15. The computing device of claim 11, wherein the first kernel is a data-parallel kernel, and wherein the second kernel is a data-parallel kernel with a different range than the first kernel.

16. The computing device of claim 11, wherein the first kernel is a task-parallel kernel, and wherein the second kernel is a task-parallel kernel.

17. The computing device of claim 11, wherein the first kernel is a task-parallel kernel, and wherein the second kernel is a data-parallel kernel.

18. The computing device of claim 11, wherein the first kernel is a data-parallel kernel, and wherein the second kernel is a task-parallel kernel.

19. The computing device of claim 11, wherein the second compute unit enqueues a barrier on a queue of commands to blocks execution of commands enqueued on the queue of commands after the barrier until the barrier completes.

20. The computing device of claim 11, wherein the second compute unit enqueues a marker on a queue of commands that does not complete until one or more other commands completes.

* * * * *